(12) United States Patent
Wunsche

(10) Patent No.: US 6,696,013 B2
(45) Date of Patent: Feb. 24, 2004

(54) METALLURGICAL FURNACE WITH SCRAP METAL PREHEATER AND DISPENSER

(75) Inventor: Edgar R. Wunsche, Whitby (CA)

(73) Assignee: EMPCO (Canada) Ltd. (CA)

( * ) Notice: Subject to any disclaimer, the term of this patent is extended or adjusted under 35 U.S.C. 154(b) by 101 days.

(21) Appl. No.: 10/037,338

(22) Filed: Nov. 9, 2001

(65) Prior Publication Data

US 2003/0122290 A1 Jul. 3, 2003

Related U.S. Application Data

(60) Provisional application No. 60/247,102, filed on Nov. 10, 2000.

(51) Int. Cl.[7] .............................................. C21B 13/06
(52) U.S. Cl. ........................ 266/142; 266/200; 266/900; 266/901
(58) Field of Search ................................ 266/900, 901, 266/200, 142

(56) References Cited

U.S. PATENT DOCUMENTS

| | | | | |
|---|---|---|---|---|
| 3,234,010 A | * | 2/1966 | Mahony | 266/901 |
| 3,759,699 A | * | 9/1973 | Geiger, Jr. et al. | 266/901 |
| 4,653,730 A | * | 3/1987 | Wunsche et al. | 266/225 |
| 4,852,858 A | * | 8/1989 | Weber | 266/901 |
| 4,881,972 A | * | 11/1989 | Weber et al. | 75/584 |
| 5,492,309 A | * | 2/1996 | Meierling et al. | 266/156 |
| 6,024,912 A | * | 2/2000 | Wunsche | 266/44 |

FOREIGN PATENT DOCUMENTS

JP         4112234474         *  8/1999

* cited by examiner

Primary Examiner—Scott Kastler
(74) Attorney, Agent, or Firm—Mark Kusner; Michael A. Jaffe

(57) ABSTRACT

A Preheater-Steelmaking Furnace and closed loop Process System for semi-continuous melting of integrally preheated recycled or virgin ferrous charge, by using highly energy efficient combustion process of natural gas combusted by oxygen as the main heat source, after preheating of the cold charge, by fully exploiting thermal energies of the melting process off-gases, in a gas tight, low noise, ecologically friendly PSF with scant CO and drastically reduced $CO_2$ in exhaust gases for semi-continuous, batch self-charging, sealed pairs of eccentrically rotating quasi cylindrical, permeable half drums hoppers creating separate preheating chambers.

14 Claims, 8 Drawing Sheets

METALLURGICAL FURNACE WITH SCRAP METAL PREHEATER AND DISPENSER

This application claim benefit of U.S. Provisional Application No. 60/247,102 filed on Nov. 10, 2000

BACKGROUND OF THE INVENTION

I. Field of the Invention

This invention relates to an explicitly by oxygen combusted fossil fuel powered, primary energy highly efficient and ecologically friendly, gas-tight, low noise, metallurgical apparatus and closed circuit process system of single structure equipment assembly for semi-continuous, batch melting of adequate size cold metallic charge, preferably recycled steel scrap, DRI, HBI and other iron containing materials by utilizing only oxy-fuel thermal energy generated by special oxy-fuel burners, after integral and gradual high temperature, low oxidation preheating of the cold metallic charge using primarily sensible and chemical thermal energy of the flue gases, augmented by special stationary oxy-fuel burners.

II. Description of the Prior Art

Iron and steelmaking production processes relate to the most energy intensive of all production processes in the industry. Moreover, metallurgical processes of iron and steelmaking are leading also in high emissions of air polluting toxic gases and production of solid hazardous wastes. Therefore, in addition to the efforts for overall lowering of energy consumption and improvement of energy efficiency, ecological considerations are becoming necessity for protection of the environment. In many cases this has been achieved by substituting one type of fuel or energy with another. However, it is obvious, that the first priority to reduce energy consumption of the majority of metallurgical processes is the highest possible utilization of the unused process system energy losses, such as sensible and chemical heat of waste exhaust gases. By returning part of this energy, by the most direct route possible, into the metallurgical process, which produced the waste exhaust gases, initial energy requirements will be reduced, resulting in overall higher energy efficiency of the process.

First and paramountly important subject of the prior art description is the subject of the type of energy used for steelmaking from cold ferrous charge mixture.

Currently, melting of the recycled steel scrap is performed predominantly in electric arc furnaces, which have, because of their relatively high commercial efficiency, flexibility of operation, smaller size and functional simplicity replaced reverberatory open hearth furnaces. Yet, in addition to the inherited overall low primary energy efficiency, electric arc furnaces are characterized also by high energy loses via exhaust off-gases. Consequently, efforts to utilize waste energy contained in the off-gases, in as possible direct way, lead to designs which incorporate energy recuperating devices for scrap preheating into current electric arc furnace structure. These electric arc furnace aggregates, of complicated design, are reaching only some of expected performance results. Moreover, they have high initial and installation costs, malfunction of mechanisms, extensive maintenance and operating safety problems, culminating in dangerous explosions. Currently, several electric arc furnaces combined with commercially available scrap preheating equipments are unacceptably polluting the atmosphere by producing large quantities of $NO_x$ which, are in certain ratios with VOC (Volatile Organic Compounds) and in the presence of sunlight forming ozone.

Not to long ago, overall thermal efficiency of the metallurgical processes and their ecological impact were not always considered important or deciding factors when the choice of the process was made. Reason for that could be found in the fact, that the cost of energies was low and that the negative ecological impacts of certain processes has not been fully understood.

However, during the last decade, the cost of energy has soared and increasing ecological damages originating from metallurgical processes became obvious and evident. It became apparent that without reduction of primary energy consumption and improvement of overall thermal efficiency of metallurgical processes, steelmaking from scrap only would not be able to exist economically. This is especially true since thermal efficiency of electric arc furnace steelmaking from scrap, when considering primary energy equivalents is in the range of only 22–25%, which is comparable to the Blast Furnace/BOF combination metallurgical process.

Besides economical problems due to the cost of electric energy and eventually its availability, low primary energy efficiency and ecological pollution problems are nova days dictating compulsory and radical improvement of metallurgical process of steelmaking from scrap. Current successful improvement of the overall performance of the process of the electric arc furnace steelmaking from scrap, by adding up to 50% of supplementing thermal energy via oxy-fuel burners to the thermal energy from electric arc, are clearly and undeniably pointing in the direction of possible fundamental change of the source of energy for steelmaking from scrap, by utilizing by oxygen combusted fossil fuels, in particular switching from electric energy to natural gas as the main source of thermal energy.

Summarized, substantial primary energy savings, resulting from replacement of deficient electric energy with efficient natural gas energy for metallurgical purposes, beneficially complimented with drastic pollution reduction, possible productivity increase and improvement of safety of operation, is indicating beyond any reasonable doubt that the electric arc furnace steelmaking from scrap—being current and prior state of the art representative—is outliving its purpose and can not compete with a non-electric metallurgical apparatus and process system, processing-melting solid ferrous charge mix, using as main thermal energy source natural gas, combusted predominantly with oxygen only and having integrated preheating of the semi-continuously charged cold recycled steel scrap or other ferrous materials.

Second, equally important subject matter of the prior art description is the application of the physical phenomena of heat transfer and the mechanism of the preheater equipment.

OBJECT OF THE INVENTION

An object of the present invention is to provide a primary energy highly efficient, ecologically friendly and pollution reducing, gas tight metallurgical apparatus and closed circuit process system of simple and compact design, for semi-continuous converting-melting of ferrous charge mix into liquefied-molten steel of adequate temperature for further processing e.g. secondary metallurgy Ladle EAF or BOF, by utilizing as only prime heat source, predominantly by oxygen combusted fossil fuel, preferably natural gas, via multitude of special, retractable oxy-fuel burners—oxygen lances, after integrated, controlled, gradual and sequential, simultaneous and highest temperature assuring reduced oxidation preheating of cold metallic charge, utilizing primarily thermal energy contained in the melting process off-gases and augmented by combustion of all combustible substances being introduced with the ferrous charge mix and variable output and stationary fuel-oxygen variable ratio oxy-fuel burners, all of the gases exhausted unidirectionally with the gravitationally descending-dropping ferrous charge mix, which makes it altogether possible to overcome the plurality of aforementioned and common disadvantages and drawbacks of known, prior and current state of the art, cold metallic charge melting devices, primarily electric arc furnaces.

Another object of the present invention is to provide a self standing autonomous metallurgical apparatus of compact and rugged design with mechanism groups functionally complimenting each other and assuring ease maintenance access to all mechanism with enhanced safety of operation with the emphasis on the safety of personnel.

Another object of the present invention is to provide more than one level of dual function, sealed pairs of air and/or water cooled heat resisting, eccentrically rotating cylindrical half-drums/hoppers, creating at least two (2) independent chambers of the metallurgical apparatus and process system and also serving for holding of the metallic charge during process of preheating and for controlling gravitational descent-dropping of the metallic charge from one preheating chamber to another and finally into the furnace.

Another object of the present invention is to provide at least one pair of air and/or water cooled heat resisting eccentrically rotating cylindrical half-drums/hoppers for at least one top chambre, each of the half-drums having end flanges, openings and passages allowing functionally desirable flow of scrap preheating high temperature gases between preheating chambers, with high temperature preheating gases originating from melting process in the refractory lined furnace shell.

Another object of the present invention is to provide at least one pair of air and/or water cooled heat resisting rotating cylindrical half-drums/hoppers for the lowest preheating chamber each of the half-drums having end flanges, openings and passages allowing functionally desirable flow of scrap preheating high temperature gases to be exhausted through the openings in the cylindrical half-drums.

Another object of the present invention is to provide air and/or water cooled heat resisting cylindrical, eccentrically rotating half-drums, each of the half-drums/hoppers having at both ends conical diameter reduction and provided with circular track for location and rotation of the half-drums around their longitudinal axis.

Another object of the present invention is to provide at least two sets of roller assemblies engaged with the circular track at each end of the cylindrical rotating half-drums/ hoppers securing their location and allowing their rotation and attached to the apparatus main supporting structure with appropriate distance between rollers.

Another object of the present invention is to provide at least one hydraulic cylinder at each end of each of the cylindrical rotating half-drums with one end of each hydraulic cylinder connected to the appropriate radius point on the side of the cylindrical rotating half-drum and the other end of each hydraulic cylinder connected to the apparatus main supporting structure; with this arrangement extending and contracting of hydraulic cylinders at the ends of the cylindrical rotating half-drums, located on the outside of the vertical metallic sealing walls, is resulting in controlled reciprocating rotating motions of the half-drums around their longitudinal axis.

Another object of the present invention is to provide air and/or water cooled vertical metallic sealing walls attached to the to the apparatus main supporting structure at the ends of the cylindrical rotating half-drums and having circular openings of the diameter corresponding with the diameter of the circular end the half-drums allowing dynamic gas-tight sealing of the cylindrical rotating half-drums against the stationary vertical sealing walls.

Another object of the present invention is to provide air and/or water cooled vertically oriented metallic sealing wall segments attached to the apparatus main supporting structure with the corresponding outside radius of the solid cylindrical portion of the cylindrical rotating half-drums and serving for dynamic gas-tight sealing of the inside of the cylindrical rotating half-drums against outside ambient.

Another object of the present invention is to eliminate need for any type of cranes for direct feeding of ferrous charge mix into the of the metallurgical apparatus or its melting furnace as such.

Another object of the present invention is to provide a filling station, preferably at the ground level, said level being the level of the recycled steel scrap storage, for ease and convenient filling of one of the dual charging bucket type semi-continuous, batch charging mechanism with recycled steel scrap of adequate size, preferably via scrap storage handling cranes, with simultaneous filling and mixing into the said dual charging bucket DRI, HBI and other iron containing materials.

Another object of the present invention is to provide at least one charging device for semi-continuous, gas tight batch charging operation, of the preheating functional group, the metallurgical apparatus having two independent, inclined charging device lifting carriages equipped with charging device inserting and withdrawing mechanism for gas tight inserting and withdrawing of the charging device into and from the top chamber of the Preheater of the unified PSF metallurgical apparatus.

Another object of the present invention is to provide more than one air and/or water cooled charging enclosures of the top chamber, each charging enclosure having two major openings of which one is equipped with hydraulic cylinder controlled water cooled doors, of which opening and closing in horizontal direction is synchronized with the gas-tight inserting and withdrawing of the charging device; the second opening is serving for introduction of the high temperature off-gases originating from the melting process in the refractory lined furnace shell.

Another object of the present invention is to provide two, rectangular charging devices equipped with hydraulic cylinders controlled opening and closing of the cylindrical half-drums/hoppers and with rail type wheels, riding on water cooled rails inside of the top chamber enclosure for easier inserting and withdrawing of the rectangular charging device into and from top chamber enclosure.

Another object of the present invention is to provide refractory lined melting furnace tilltable shell, preferably of oblong shape, which is for expedient and trouble free exchange located on a self-propelled transfer car.

Another object of the present invention is to provide refractory lined melting furnace shell with, in normal operating position slanted configuration of the shell bottom refractory and steel structure, the lower level of the slant oriented toward the tapping opening in refractory bottom lining.

Another object of the present invention is to provide the refractory lined melting furnace shell with horizontally oriented tapping device located in the shorter sidewall of the rectangular shaped furnace shell, allowing complete draining of the furnace shell liquid content when in normal operating position.

Another object of the present invention is to provide the refractory lined melting rectangular shaped furnace shell with generally vertically oriented water cooled tubular device, located on the outside of the furnace shell steel structure above the tap hole and controlled with a hydraulic cylinder for tap hole cleaning and filling with temporary, tap hole sealing granulated refractory material.

Another object of the present invention is to provide the refractory lined melting furnace shell with slag removing and inspection opening located in the other shorter sidewall of the rectangular shaped furnace shell, opposite of the slag free tapping device shorter wall.

Another object of the present invention is to provide a closing door for the slag removing and inspection opening, its opening and closing operated by a remotely controlled hydraulic cylinder.

Another object of the present invention is to provide a water cooled, preferably of tubular design, circumferential vertical wall like extension, extending upwards from and permanently attached to the steel structure of the refractory lined melting furnace shell for containing preheated but still not melted ferrous scrap mixture, this vertical extension being slanted inwards with top edge of the extension being closer to both horizontal centrelines of the furnace shell.

Another object of the present invention is to provide a water cooled, preferably of tubular design, circumferential vertical wall like sealing enclosure extension, extending downwards from and during normal operation cycle permanently attached to the stationary sealing enclosure of the main supporting structure, this vertical extension being also slanted and matching the slant of the circumferential vertical wall like sealing enclosure of the refractory lined melting furnace shell, with adequate gap between the two circumferential vertical wall like extensions allowing their non-contacting movement.

Another object of the present invention is to provide two trunnions, having a common horizontal axis and permanently attached to the steel structure of the refractory lined melting furnace shell and positioned closer to the taphole side of the furnace shell allowing the entire rectangular shaped and refractory lined melting furnace shell including to the shell permanently attached tubular circumferential vertical wall like extension and all other to the furnace melting shell attached accessories and also including solid or liquefied ferrous scrap mixture charge to rotate in vertical directions around the common axis of the two trunnions.

Another object of the present invention is to provide two supporting structures, permanently attached to the furnace shell transporting-transfer car, each support equipped with a bearing for locating and housing of the two trunnions attached to the furnace shell steel structure.

Another object of the present invention is to provide two, remotely controlled single acting hydraulic cylinders, with one end of each cylinder connected in swiveling arrangement to the brackets of the structure of the furnace shell transporting-transfer car and the other end of each cylinder connected in swiveling arrangement to the brackets permanently attached to the melting furnace shell steel structure, the hydraulic cylinders in their extended mode safely holding the entire rectangular shaped and refractory lined melting furnace shell including all to the melting furnace shell attached accessories in horizontal operating position and with the hydraulic cylinders in their semi-retracted or totally retracted mode allowing decanting of the slag or safely holding liquid steel hot heel, made possible by vertical-rotating movement of the furnace around its two trunnions.

Another object of the present invention is to provide more than one multipurpose, water cooled, retractable, special shape and concentrated high temperature flame torch producing oxy-fuel burner—oxygen lance devices for melting of preheated ferrous charge mix and superheating of liquefied charge—molten steel prior to tapping, oxy-fuel burners of the devices being equipped with rapid variation of fuel/oxygen ratio response.

Another object of the present invention is to provide one retractable, special shape water-cooled, multipurpose device for mechanized molten steel sample taking, temperature measuring and carbon and oxygen content in molten steel measuring.

Another object of the present invention is to provide more than one oxy-fuel burners with rapid variation of fuel/oxygen ratio response, installed in preheating chambers of the metallurgical apparatus for enhancing combustion of all combustibles contained in the ferrous charge mix, produced during gradual preheating process of the ferrous charge mix.

Another object of the present invention is to provide a system of sensors located in each of the ferrous charge mix preheating chambers and other location of the metallurgical apparatus and process system for close to real time gases analysis, flow of gases, pressure and temperature measurement, for achieving gradual and total combustion of all combustibles developed during ferrous charge mix preheating, melting and superheating.

Another object of the present invention is to provide a steam developer, functionally located at the exit of the flue off-gases from the end combustion chamber and drop-out box, further utilizing still high thermal energy of the flue off-gases for developing steam.

Another object of the present invention is to provide a slit type Ventury scrubber for instantaneous shock cooling of the hot flue off-gases, functionally located at the exit of the gases from the steam developer and cooling of the gases bellow the critical temperature of the de novo synthesis of dioxins, and furans.

Another object of the present invention is to provide adequate negative pressure via jet pump, using as propellant steam developed by the steam developer, functionally located at the point of exit from the slit type Ventury scrubber of the process system assuring proper functional negative pressures through the entire metallurgical apparatus.

Another object of the present invention is to provide a wet cyclone type cleaning device, for final cleaning of the cooled off flue gases prior of their releasing into the atmosphere.

Another object of the present invention is to provide adequate size opening in the circumferential vertical wall like extension, extending downwards from and during normal operation cycle permanently attached to the stationary sealing enclosure of the main supporting structure, for exhausting totally combusted high temperature off-gases originating from the ferrous charge mixture melting process via explicitly with oxygen combusted fossil fuel.

Another object of the present invention is to provide refractory lined and water cooled high temperature off-gases transferring gas-tight duct with dampers, connecting the adequate size opening in the circumferential vertical wall like extension with the opening in the water cooled charging enclosure of the top chamber for introduction of the high temperature off-gases originating from the melting process in the refractory lined furnace shell into the top chamber of the metallurgical apparatus for initial stage of ferrous charge mixture preheating.

Another object of the present invention is to provide refractory lined and water cooled high temperature off-gases transferring gas-tight ducts with dampers, for exhausting used flue gasses from the dynamically sealed centre openings in the end flanges of the cylindrical half-drums into the common end combustion chamber and drop-out box.

Another object of the present invention is to provide refractory lined and water cooled high temperature gas-tight by-pass duct equipped with damper closures and connecting the end combustion chamber and drop-out box with the gas-tight duct from the melting furnace chamber, allowing high temperature gases from the melting furnace chamber to be rerouted directly into the end combustion chamber and drop-out box, by opening and closing proper dampers.

All other pertinent objects and features of the present invention will become apparent from the following summary of the preferred embodiments of the invention and detailed description considered in conjunction with the accompanying drawings. It is to be understood, however, that the drawings are introduced solely for the purposes of illustration and not as definition of the limits of the invention, for which reference should be made to the appended claims.

SUMMARY OF THE INVENTION

In accordance with the objects of invention, disadvantages and drawbacks of known and prior art of steel scrap—ferrous mixture charge melting furnaces, especially electric arc furnaces are to be overcomed by recycling steel scrap—ferrous charge mix in a Metallurgical Apparatus and closed loop Process System for semi-continuous melting of adequate size metallic charge, preferably recycled steel scrap, Direct Reduced Iron (DRI), Hot Briquetted Iron (HBI) and other iron containing materials by using highly primary energy efficient predominantly by oxygen combusted fossil fuel as only prime heat source, after integral, controlled, gradual and sequential, simultaneous high temperature preheating of the cold metallic charge, by directly and efficiently exploiting a portion of the thermal energy of the melting process off-gases, moreover, negative pressure required for functional circulation of hot gases through the said Metallurgical Apparatus and Process System and final exhaustion of the off-gases from it being produced by ejector type pump, propelled by steam, also developed by another portion of the thermal energy of the off-gases, prior to their rapid cooling by quenching. Because high efficiency semi-continuous gradual high temperature preheated ferrous mixture charge, with heating gases permeating through the charge downwards, is dropped directly and gas-tight into the hearth of the melting furnace the metallurgical apparatus and closed loop process system in accordance with the object of invention will affect to a large extent the known steelmaking process making steel predominantly from recycled steel scrap. Since in accordance with the objects of the invention the special shape retractable permanent metallic water cooled oxy-fuel burners and oxygen lance devices are eliminating electric energy as the main source of thermal energy, resulting also in elimination of graphite electrodes, the outcome is substantial savings of primary energy up to now required for melting of ferrous charge mix charge in electric arc furnace. Furthermore, steelmaking from scrap in the metallurgical apparatus and closed loop process system in accordance with the object of invention will result in drastic reduction of quantity of off-gases and harmful substances related to the primary energy. According to the invention the overall thermal energy introduced into melting furnace is not limited by the size of electrodes and therefore melting time and total tap-to-tap heat time depends only on the number and power of the special oxy-fuel burners. According to a preferred embodiment the Ain-line@ arrangement of the special shape oxy-fuel burners over the surface of the melting furnace hearth are assuring optimal transfer of thermal energy from the burner torches to the solid preheated ferrous charge mix or liquefied molten steel bath. In accordance with the invention multi point introduction of thermal energy into the melting furnace enhances slag metal interaction for better metallurgical results.

In accordance with the invention, the metallurgical apparatus and process system is of design assuring sealed, gas-tight operation. Without sealing and eventually improper operating practice, the amount of exhausted gases from a conventional electric arc furnace could reach 400–450 $Nm^3$/tonne of produced steel. Metallurgical apparatus and process system according to the invention allowing high energy input and high energy efficiency is characterized in that, preheated ferrous charge mix, liquefied—melted via high temperature oxy-fuel burners in gas-tight melting furnace vessel produces only amount of gases lesser or equal of sealed electric arc furnace in a range of 100–130 $Nm^3$/tonne. Use of decarburizing oxygen lance increases proportionally the amount of gases produced and exhausted.

Summarized, the Metallurgical Apparatus and Process System in accordance with the object of the invention encompasses numerous major and minor, direct or indirect functional and process system parameters and operating characteristics suitably assembled into an embodiment giving it:

Fundamental capability as finishing cycle of the closed loop process system, to perform in the refractory lined furnace vessel of the metallurgical apparatus rapid melting of the during preceding cycles preheated, semi-continuously, batch charged ferrous charge mix, utilizing as the main source of thermal energy for the process of melting the primary energy efficient, predominantly by oxygen combusted fossil fuel, said melting being continuation of the integral, highly efficient, gradual, reduced oxidation and controlled high temperature process of preheating of the said ferrous charge mix, preferably recycled steel scrap of adequate size, DRI (Direct Reduced Iron), HBI (Hot Briquetted Iron) and other iron containing materials, the said ferrous charge mix being cold batch charged into the top chamber of the metallurgical apparatus and the said preheating being performed by advantageously and primarily exploiting thermal energy contained in the high temperature off-gases from the melting process in the said furnace vessel augmented by stationary, variable output and variable fuel-oxygen ratio oxy-fuel burners, located in the top and lower chambers, said high temperature off-gases being transferred via external ducts from the interior of the furnace vessel into the space above the initially cold ferrous charge mix, batch charged into the top chamber of the metallurgical apparatus, followed by downward permeation of the hot gases through the ferrous charge mix in the top and lower chamber, from where said off-gases are via second set of external ducts transferred into the end combustion chamber and drop-out box followed by additional transfers of the off-gases, for utilization of the still high thermal energy in the said off-gases in the steam development equipment and into the quenching equipment assembly for cooling of the gases temperature below the range of the de novo development of unacceptable level of dioxins and furans and finally cleaning prior to release into the atmosphere, with all negative pressure suction flows of the gases through the entire gas-tight metallurgical apparatus being produced by the more than adequate, ease to control, suction effect of the ejector pumping equipment propelled by the "energy free, in-house" generated steam.

Fundamental capability to advantageously replace the current state of art and all known designs of metallurgical electric arc furnaces, with or without any kind of charge preheating, preferably steelmaking electric arc furnaces used for melting of ferrous charge mix, preferably recycled steel scrap of adequate size, DRI (Direct Reduced Iron), HBI (Hot Briquetted Iron) and other iron containing materials, primarily due to the facts that:

Metallurgical apparatus and process system in accordance with present invention consumes overall less primary energy and produce less harmful off-gases by having significantly higher primary energy efficiency;

eliminates complicated and costly electric energy supply system including voltage fluctuations (flicker) in the electric energy supply network;

eliminates costly and primary energy deficient graphite electrodes eliminates charging downtime and improves productivity by eliminating necessity to remove roof for charging;

eliminates substantial losses caused by opening of the electric arc furnace for batch charging via conventional charging bucket;

by being practically gas-tight improves ecological friendliness;

by using sub-sonic oxy-fuel burners reduces noise pollution;

by low height and compact space economizing design, economizes meltshop building size;

being closed loop process system improves working conditions and safety of operation;

reduces operation and investment costs.

Capability to perform semi-continuous, batch self-charging of the ferrous mixture charge from the adjacent ferrous charge mix charge storage on the ground level into the water cooled enclosure of the top chamber of the metallurgical apparatus, preferably by the dedicated semi-continuous, batch mode dual charging bucket type charging mechanism, being an integrated part of the metallurgical apparatus and process system, for gas-tight charging, having two independent carriages each equipped with a special permanent, remotely controlled hydraulic cylinder operated, rectangular shape clam-shell type bucket, with inserting and withdrawing mechanism for each bucket into and from the water cooled enclosure of the top preheating chamber, thus eliminating necessity for conventional multitude of independent charging buckets and overhead charging crane.

Capability to evenly and uniformly drop a portion of the cold ferrous mixture charge, independently from each of the two special permanent, rectangular shape charging buckets, when short term parked inside of the water cooled enclosure of the top chamber of the metallurgical apparatus and above the top chamber bottom creating pair of individually sealed and air and water cooled heat resisting rotating cylindrical half-drums, by remotely actuating hydraulic cylinder to open wide the clam-shell jaws of the rectangular charging bucket, resulting in, that the said portion of the cold ferrous mixture falls out from the said charging bucket and fills-up the cavity of the top chamber, created by the two rotating cylindrical half-drums in their closed position, allowing closing of the clam-shell jaws of the empty charging bucket and prompting its withdrawal from the top chamber water cooled enclosure.

Capability to hold the said portion of the ferrous charge mix by the pair of rotating cylindrical half-drums of the top chamber in their closed position, for the preset duration of time, allowing the primary high temperature off-gases originating from the melting process in the furnace vessel to permeate downward through the said portion of ferrous charge mix and by doing so to transfer part of their thermal energy into the ferrous charge mix, resulting in partial only cooling of the gases with simultaneous, also partial only temperature increase of the said portion of the ferrous charge mix to the range of temperature further resulting in combusting of prevailing majority of combustible materials contained in the ferrous charge mix and as well increase of combustible gaseous components in the partially cooled of gases, the said combustible gases originating from partial combustion of the portion of the solid combustible materials contained in the ferrous charge mix, said secondary combustible mixture of the gases being transferred via openings and passages in the walls of the pair of the rotating cylindrical half-drums of the top chamber into the space above the ferrous mixture charge in the lower chamber of the metallurgical apparatus, after the temperature of the said secondary gases mixture has been increased by their total combustion by variable gas-oxygen mixture of the auxiliary oxy-fuel burners controlled by real time gases analyzing system, the said portion of the ferrous charge mix in the lower chamber being during the previous stage of preset heating time already partially preheated in the top chamber, prior to being dropped into the vacant space of the lower chamber.

Capability to hold and support by the lower chamber pair of rotating cylindrical half drums in their closed position, during previous stage in the top chamber partially preheated and into the lower chamber dropped portion of ferrous mixture charge, for the further preset heating duration time, allowing the secondary, increased temperature gases to permeate downward through the already partially preheated portion of the ferrous charge mix, now located in the lower chamber and which at this stage is free of contaminating combustible materials and by doing so transfer part of their thermal energy into the ferrous charge mix, resulting in partial only cooling of the gases with simultaneous additional temperature increase of the ferrous charge mix portion in the lower chamber of the metallurgical apparatus, to the temperature range of the ferrous charge mix and gases which is above the critical value required for burning-cracking of undesirable volatile hydrocarbons including dioxins and furans, the said partially cooled gases then being exhausted via openings and passages in the walls of the pair of the rotating cylindrical half-drums and external ducts into the end combustion chamber and drop-out box and for further processing as per process system, including additional efficient exploitation of the thermal energy of the off-gases.

Capability to utilize the specific oscillating rotary function of the pairs of rotating cylindrical half-drums of the top and lower chambers of the metallurgical apparatus, causing large opening between cylindrical half-drums allowing even largest pieces of the ferrous charge mix to descent with the rest of the charge, for by process system requirements controlled dropping of the predetermined mass of ferrous mixture charge, after efficient, gradual, low iron oxidating preheating, from the said top chamber into the lower chamber and from the said lower chamber into the refractory lined melting furnace vessel with from the interior of the vessel withdrawn special multi-purpose and unique combination design of unified oxy-fuel burner and oxygen lance housed in adequately curve shaped and intensively water cooled body.

Capability to significantly reduce the amount of hot gases exhausted from the furnace melting vessel;

Capability to perform low noise, low oxidation and efficient rapid melting of the semi-continuous, batch charged preheated ferrous charge mix in the refractory lined hearth of the furnace vessel of the metallurgical apparatus, by using special said multi-purpose and unique combination design of unified oxy-fuel burner and oxygen lance housed in adequately curved shaped and intensively water cooled body, for introduction primary energy efficient, predominantly by oxygen combusted fossil fuel at splashing surpresing super-and sub-sonic velocities, Capability to perform safely, without interrupting furnace operation, mechanized molten steel sample taking from the furnace vessel and as well temperature measuring and measuring of carbon and oxygen content in the molten steel;

Capability to improve overall energy efficiency by replacing primary energy deficient electric energy with primary energy highly efficient fossil fuel combusted explicitly with oxygen only and advantageously exploiting thermal energy of the off-gases by performing integrated preheating of the ferrous charge mix and using remaining surplus of the off-gases thermal energy for additional heating purposes e.g. generating steam;

Capability to most efficiently control of oxygen sustained combustion of any and all combustibles introduced into melting and integral preheating processes of the ferrous charge mix using as close as possible to the real time gas analyzing system GOODFELLOW for predictive and instant indepent control of each moving—retractable (in the furnace melting vessel) and stationary (located in each preheat chamber and end combustion chamber) oxy-fuel burners, providing complete safety of operations and therefore eliminating possibility of creation of explosive situations inside of the gas-tight metallurgical apparatus under normal Steel Mill Meltshop operating conditions, and providing protectively oriented safety relief valves and membranes and all other requirements in strictest accordance of all valid safety of operation codes, standards and regulations.

Capability to carburize and decarburize and superheat molten steel to the required tapping temperature by using specially shaped oxygen lances protruding into the interior of the furnace vessel;

Capability to decant slag from the furnace shell-vessel via deslagging opening by tilting the furnace vessel toward the deslagging opening around trunnions arranged on the outside of the furnace shell steel structure via hydraulic cylinders attached to the steel structure of the furnace shell in the vicinity of the slag opening in the shorter wall of the furnace vessel;

Capability to tap molten steel from the furnace vessel by only opening of the horizontally oriented tapping mechanism, without moving—tilting of the furnace shell equipped with toward the tap hole slanted hearth refractory assuring adequate ferrostatic pressure until nominal heat size mass of steel has been tapped;

Capability to tap molten steel from the furnace vessel slag free, by rapid tilting of the furnace vessel toward the deslagging opening, until furnace vessel slanted hearth refractory reaches angle opposite to the angle during normal operation and therefore also providing volume of the furnace hearth necessary for hot heel if required, top level of the hot heel steel remaining in the furnace vessel being bellow the level of the bottom of the generally horizontally oriented tap hole opening;

Capability to remain reasonably sealed against infiltration of the metallurgical apparatus surrounding ambient atmosphere during operational requirement of tilting the furnace vessel, because of water cooled, preferably of tubular design, circumferential vertical wall like extensions one attached to the permanent supporting structure, the other to the steel structure of the furnace vessel shell and during tilting moving against each other with relatively small gap;

Capability to properly clean the tap hole opening from eventual frozen steel residues by using pressurized oxygen and ability to fill the cleaned tap hole opening with special granular refractory material after closing mechanism of the tap hole is put in the closed mode, the cleaning and filling of the tap hole being completely mechanized assuring maximum correct repeatability and safety of operation;

Capability to perform mechanized, remotely controlled cleaning and filling of the tap hole utilizing for that purpose tap hole servicing device, in principle consisting of main water cooled tubular member with curved tip protruding into the interior of the furnace vessel, tubular member guiding and supporting mechanism with remotely controlled repositioning hydraulic cylinder, connecting flexible hoses for oxygen, granulated refractory material and cooling water, complete unit assembly being attached to the furnace vessel shell steel structure and therefore being tilted with the furnace vessel;

Capability to facilitate simple and easy removal and return of the complete refractory lined furnace vessel from and to its normal operating position under and inside of the supporting structure of the metallurgical apparatus by using furnace preferably self-propelled vessel transfer car on which the furnace vessel only is supported at the tap hole side via two supporting structures permanently attached to the transfer car frame and engaged with the furnace vessel shell steel structure trunnions and on the deslagging side via two hydraulic cylinders attached via swiveling connecting devices to the furnace vessel shell steel structure and on the other sides to the transfer car frame, transfer car being mobile on the tracks and flanged rail type steel wheels.

Summarized, but not limited to the extent of herein listed capabilities in accordance with the objects of the present invention are conclusively demonstrating and attesting substantial improvements of practically all technical economical, ecological, operational and safety of operation and working condition criteria and parameters, when compared with current state of the art steelmaking furnace from similar ferrous charge mix in electric arc furnace:

Total elimination of electric energy used as main source of melting with electric arc has primary energy efficiency of only 20–25% when produced from fossil fuel in a thermal power plant;

Total elimination of graphitized electrodes, consumed in a range from 1.0 to 1.5 kg/ton of liquid steel and consuming approximately 3,000 kW/ ton of actual electric energy or 4–6 kWh/kg of graphitized electrodes related to the primary energy thermal efficiency of the electrodes production process;

Ability to efficiently preheat cold ferrous scrap mixture semi-continuously charged into the top compartment of the apparatus to the predetermined temperature at its discharge from the bottom compartment, including highest possible combustion of all combustible substances being introduced into the apparatus and which provides appropriate suction effects at different points of the apparatus and most importantly forcing combination of any and all gases entering the main vertical chamber to flow from the highest point of the top compartment downwards through the scrap in direction of flow concurrent with the flow of gravitationally descending scrap, combined hot gases encompassing the initial hot waste gases from the metallurgical furnace, recuperative hot gases from terminal post combustion chamber, hot gases generated by oxy-fuel burners located in the walls of the compartments and as well hot gases resulting from oxidation of combustible substances contained in the charge via administered oxygen, oxygen enriched air or air.

Ability to preheat ferrous scrap mixture to the required nominal preheating temperature, without hot waste gases from the adjacent, operating in tandem electric arc furnace, by using only oxy-fuel burners of the preheating apparatus, and force delivering of the preheated scrap into the furnace vessel at initial increased rate, prior to "cold start-up" of the furnace, and by doing so, rapidly achieve normal, "flat bath" operating conditions due to prompt creation of the pool of molten metal under special vertical oxy-fuel burners, especially when augmented with curved oxy-fuel/oxygen burner/lance and early formation of foamy slag;

Ability to reduce oxidation loss of scrap by controlled gradual, stepped preheating of ferrous scrap mixture with intermediate temperature and gas composition conditioning via real time controlled oxy-fuel burners power input and introduction of oxidants;

When compared with traditional furnace operation, using cold scrap, the above listed abilities in accordance with the object of invention result in substantial improvements of the following technical parameters and economic factors:

Eliminating necessity for electric power and furnace transformer;

Eliminating necessity and cost for graphite electrodes;

Reduction of amount of exhausted waste gases in the range of 40–45%;

Reduction of dust and hazardous substances generation in the range of 20–25%;

Reduction of dioxins and furans bellow currently permitted limits;

Elimination of electric HV, including costly compensating apparatus for optimized impedance of the EAF;

Shortening of tap-to-tap time in the range of 15–20%;

Possible down-sizing of the baghouse capacity in the range of 25–30%;

Reduced maintenance requirements due to elimination of fluctuating electric power input character of operation.

Improved working environment conditions by effective lowering of the noise pollution level and improved safety of operation primarily due to elimination of the electric arc and as well as due to semi-continuous and semi-automatic charging of the melting vessel of the metallurgical apparatus with preheated scrap in accordance with the invention, thus eliminating explosion predisposed hazardous wet scrap charging via charging bucket into an open furnace vessel as it is the case of electric arc furnace.

BRIEF DESCRIPTION OF THE DRAWINGS

For better understanding of the invention, its operating advantages and specific objects achievable by its exploitation, it will now be explained and illustrated in more detail by means of one preferred embodiment with reference to drawings and non-limiting general examples. In the attached drawings same reference characters denote similar elements throughout the several views.

DETAILED DESCRIPTION OF PREFERRED EMBODIMENTS OF THE INVENTION

Figure 1:
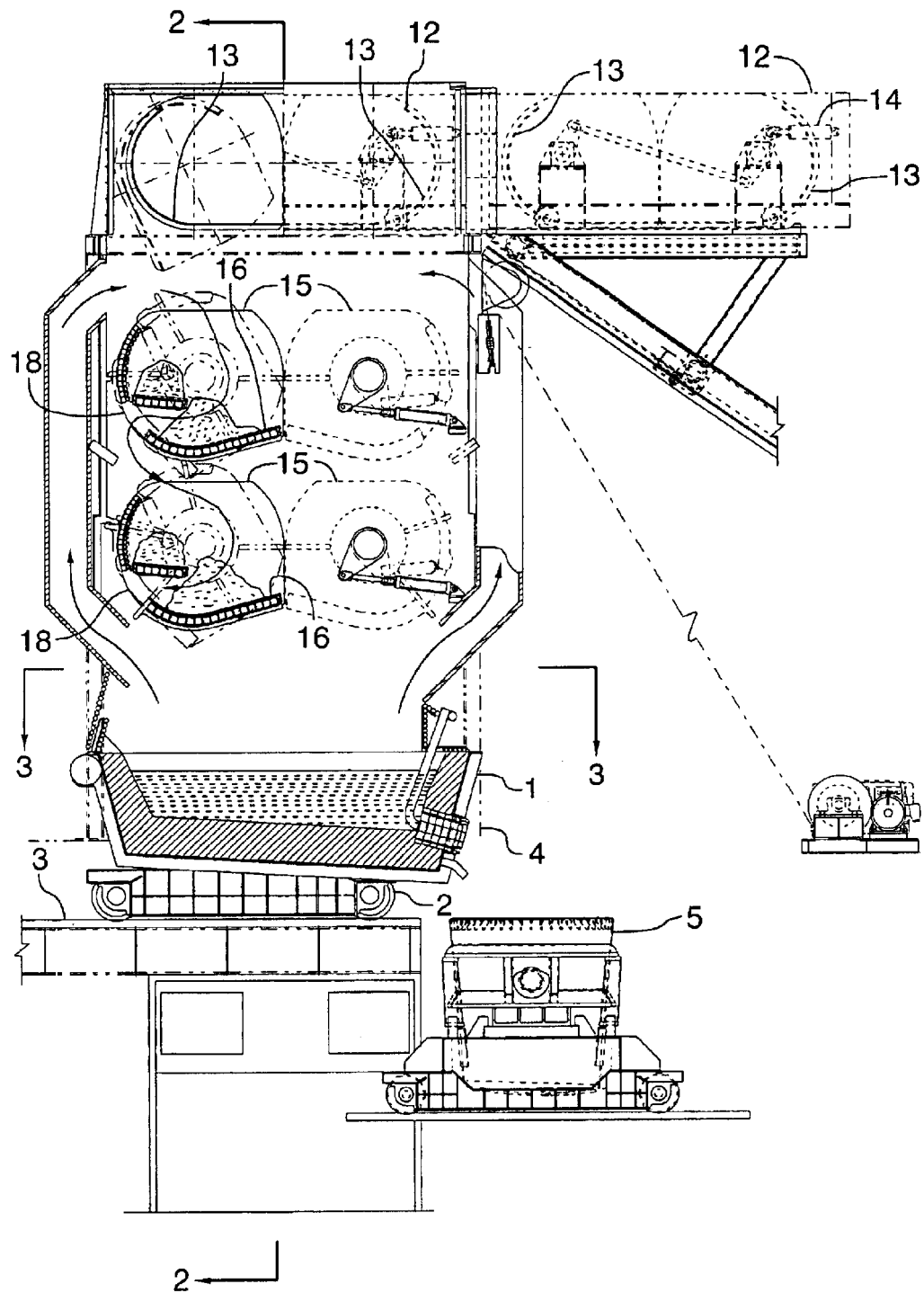
FIG. 1 shows a vertical cross-section view through the Metallurgical Furnace with vessel at the base and taphole directed toward a ladle for transferring molten steel, with a scrap/metallic charge preheater and dispenser comprising four (4) rotating quasi cylindrical hoppers located above the removable vessel.
Figure 2:
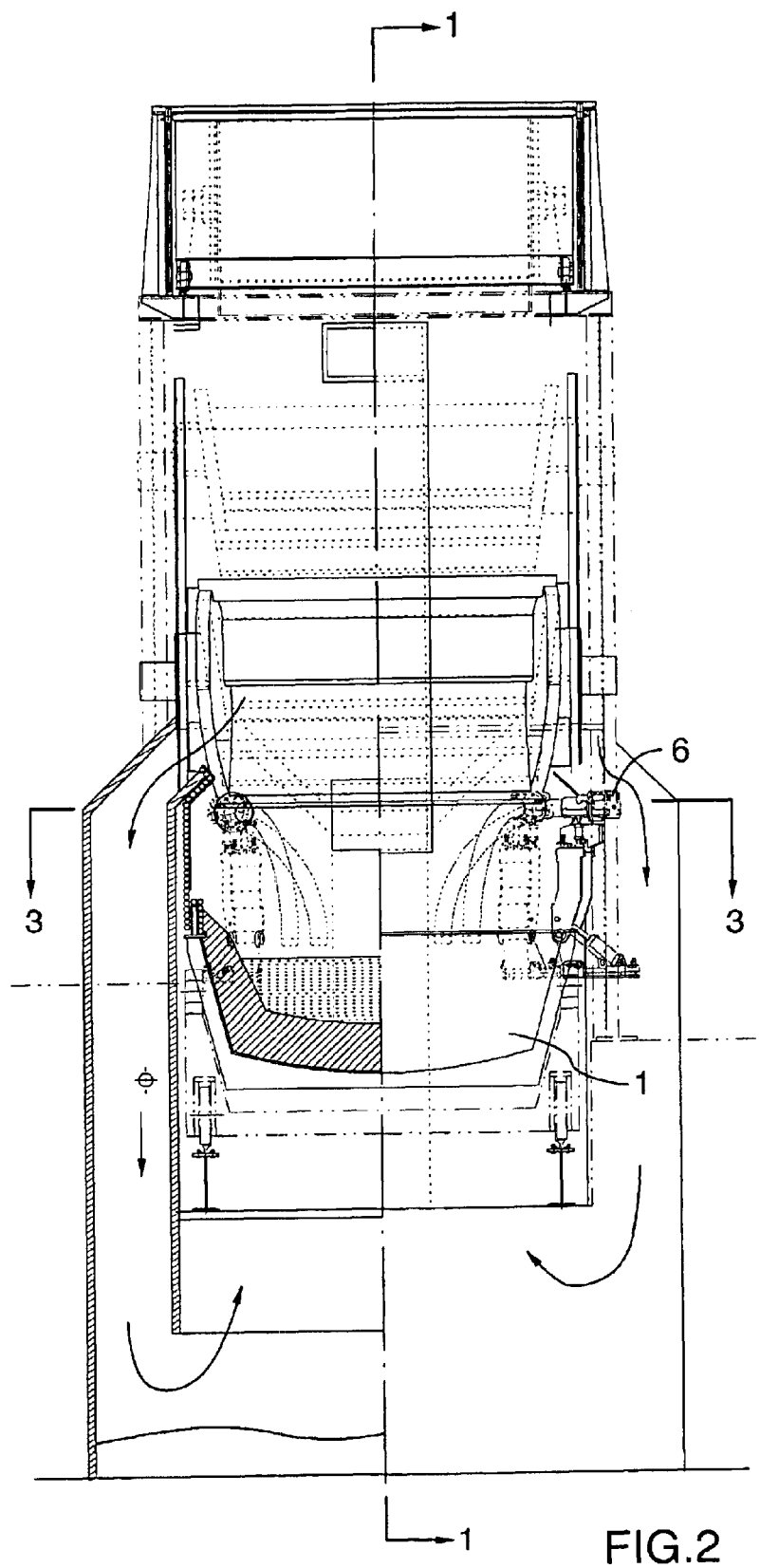
FIG. 2 shows a vertical cross-section through the Furnace assembly along lines 2—2 shown in FIG. 1.
Figure 3:
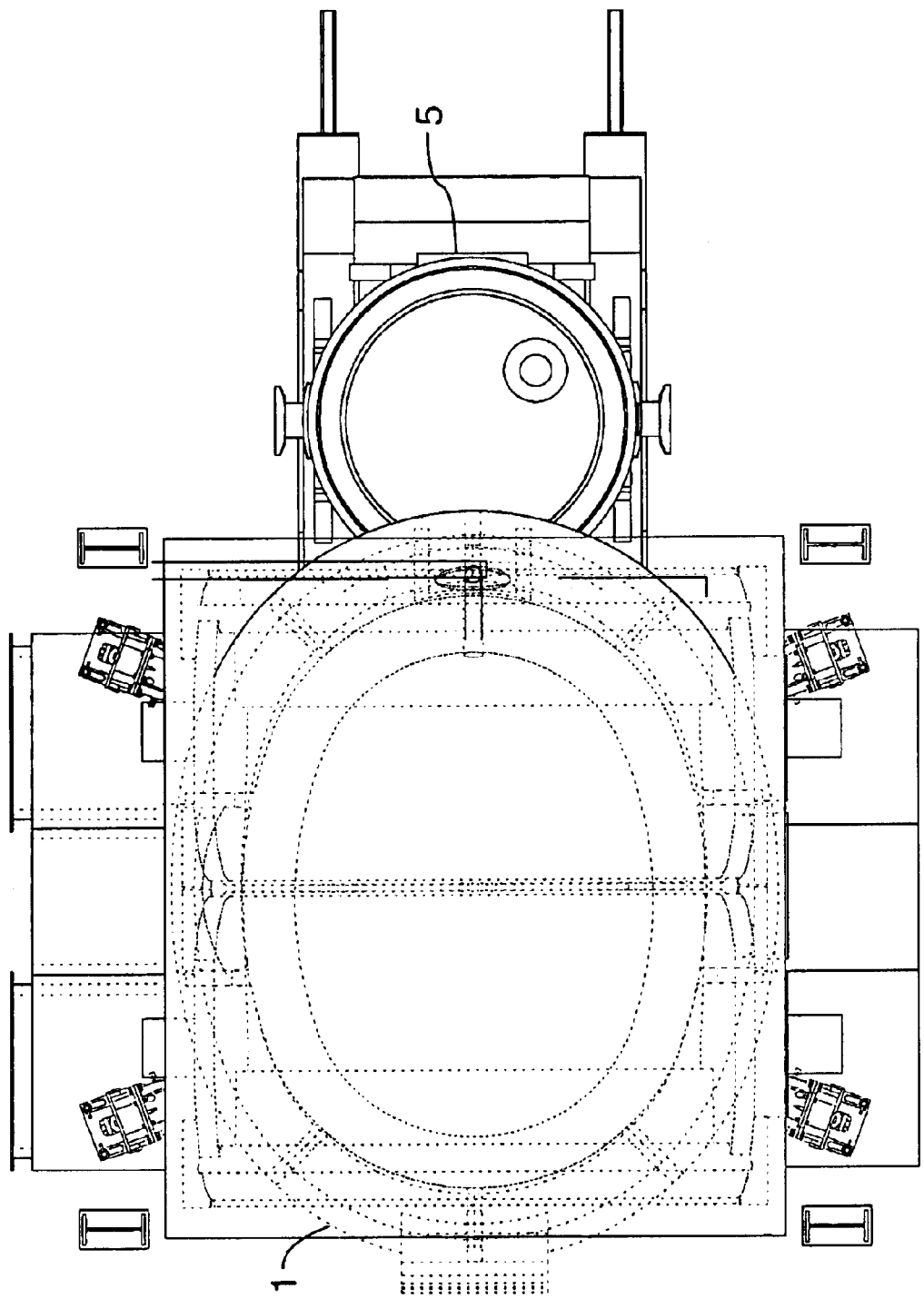
FIG. 3 is a plan-sectional view along lines 3—3 shown in FIG. 1 and FIG. 2.

FIG. 1 illustrates an embodiment of a metallurgical furnace with tilting vessel 1 mounted on a transfer car 2 that rolls on rails 3 and can be inserted and withdrawn from the furnace structure if desired for repair or replacement. In FIG. 1 the vessel is shown with a full load of molten metal, ready for tapping through the horizontally oriented taphole 4 into the molten steel/metal transfer ladle 5.

Figure 4:
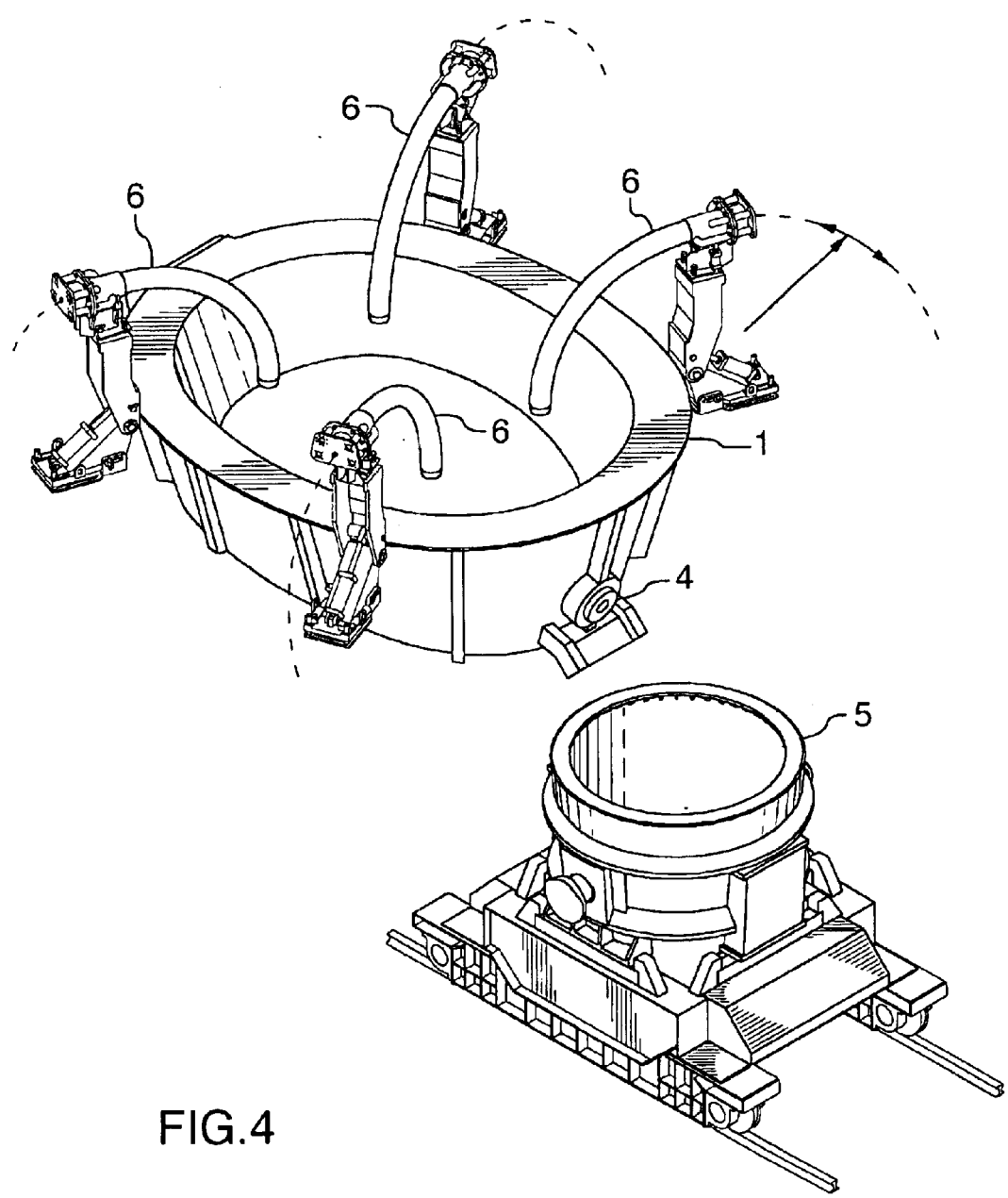
FIG. 4 is a perspective view of the vessel (with scrap preheater and dispenser above it removed for clarity) showing four retractable oxy-fuel burner/lances for heating and melting of the metallic charge and also showing molten steel transferring ladle positioned on a transfer car below the horizontally oriented taphole.

As best shown in FIG. 4 the vessel 1 and its contents are heated with four (4) retractable, generally curved oxy-fuel burners/oxygen lances 6. The oxy-fuel burners/oxygen lances 6 are rotatably inserted and withdrawn through a small opening in the sidewall of the furnace and can be easily retracted for removal of the vessel 1 along the tracks 3. The oxy-fuel burners/oxygen lances 6 need not be retracted to perform the tilting of the vessel 1 as shown in FIG. 5. and FIG. 6.

Figure 5:
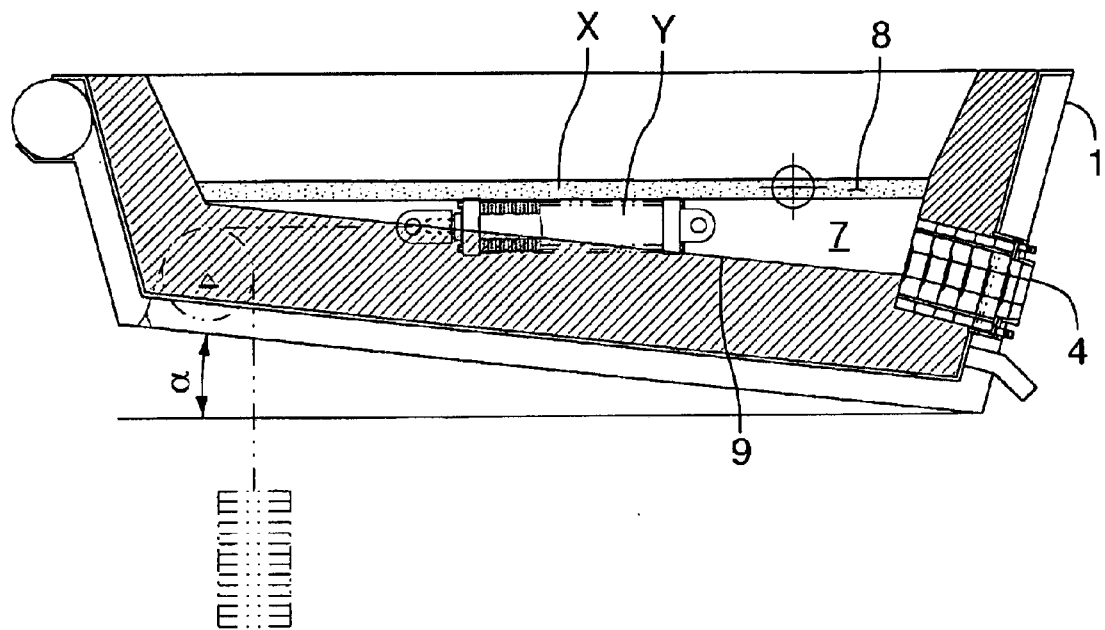
FIG. 5 is a sectional view through the Furnace vessel, showing slanted refractory bottom with horizontally oriented taphole in the position shown in FIG. 1.
Figure 6:
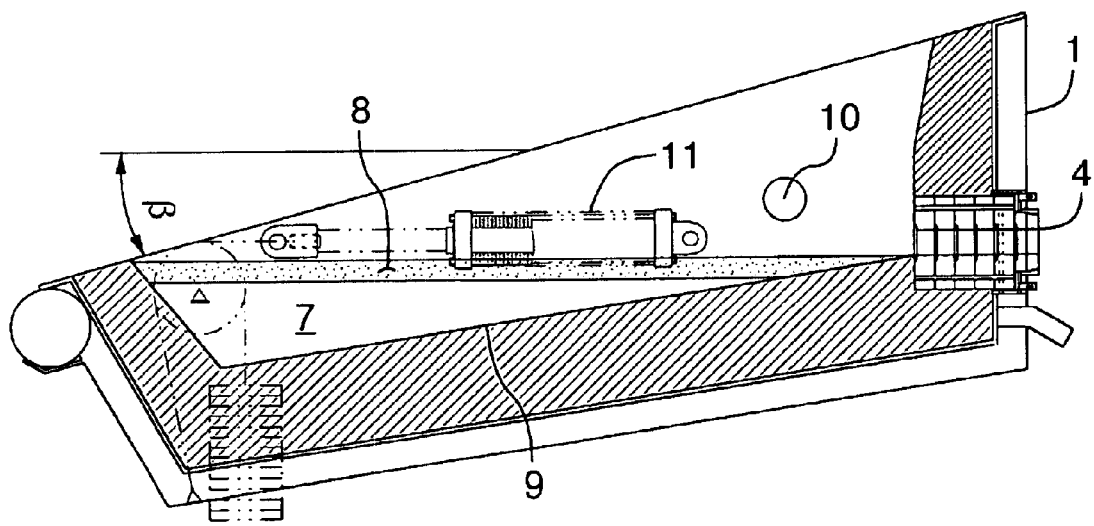
FIG. 6, however, shows the Furnace vessel tilted toward the slag door and therefore preventing steel or slag entering the horizontally oriented taphole.
Figure 9:
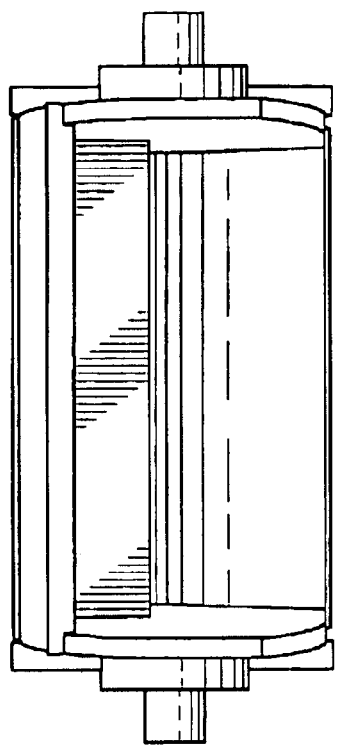
FIGS. 7, 8, 9 and 10 show details of the eccentrically rotatable quasi-cylindrical half-drums/hoppers in the closed position as in FIG. 1 to contain metallic scrap charge on shelves for pre-heating with exhaust gases.
Figure 10:
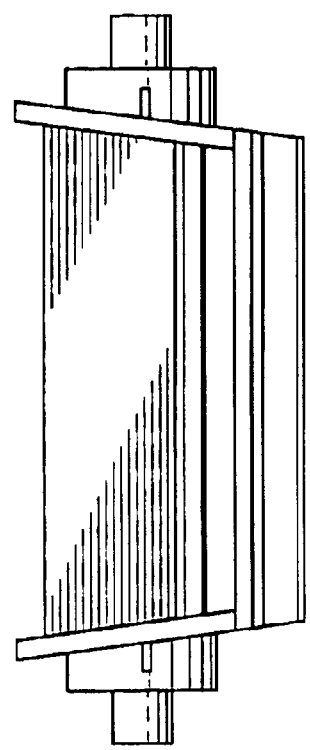
Figure 7:
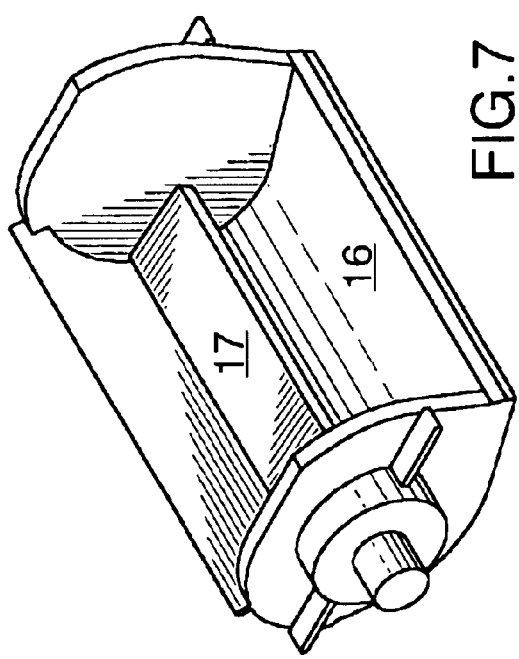
Figure 8:
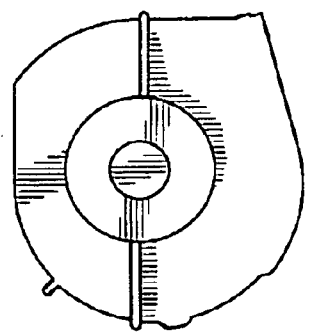
Figure 13:
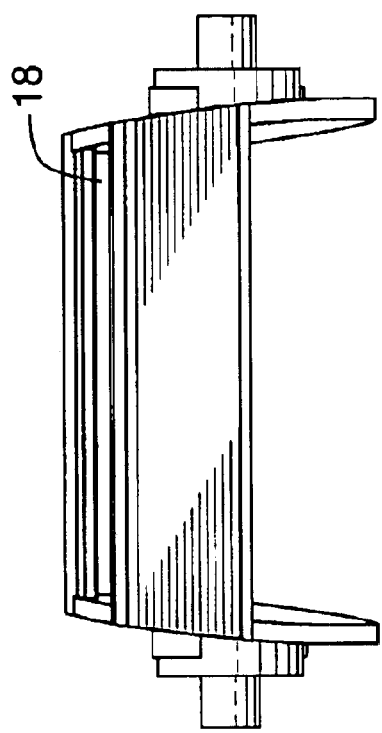
FIGS. 11, 12, 13 and 14 show the same eccentrically rotatable quasi-cylindrical half-drum/hopper rotated in its dump position allowing the scrap and other ferrous metallic charge to descent by gravity downwardly to the next layer of eccentrically rotatable quasi cylindrical half-drum/hoppers and shelves.
Figure 14:
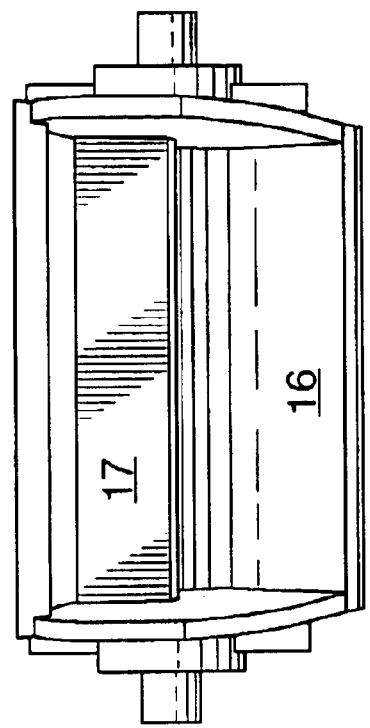
Figure 11:
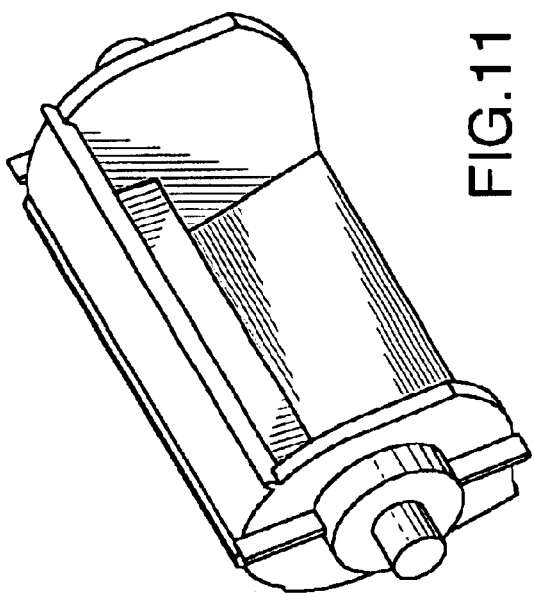
Figure 12:
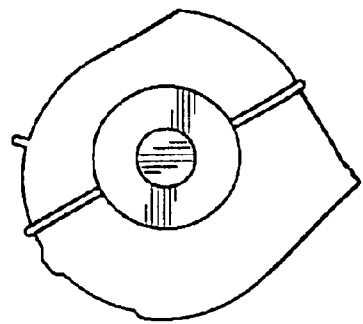

With reference to FIG. 5, the position of the vessel 1 is shown with the maximum amount of molten metal 7 with slag 8 above withdrawn through the horizontally oriented taphole 4 placed at the low point of a sloped refractory lined bottom 9. As indicated in FIG. 6., the entire vessel 1 is mounted to rotate around the trunnion 10 and can be tilted rearward to retain the "hot heel" of molten metal 7 and slag 8 for performing of slag free tapping of molten metal 7 only into the molten steel transfer ladle 5. Tilting of the vessel 1 around trunnions 10 is facilitated with hydraulic cylinders 11 which extend to tilt the vessel 1 rearward with, for example, a pulley, cable and counter-weight system as illustrated in FIG. 5. And FIG. 6.

The scrap pre-heating and dispensing device is fixed in position immediately above the movable vessel 1 and serves to contain solid scrap and other ferrous charge and redirect and utilize hot exhaust waste gases, emanating from the furnace chambre, for pre-heating purpose. The waste hot gases are used for scrap pre-heating and physically remove suspended particles. Solid cold scrap and other ferrous material charge materials are delivered as shown in FIG. 1 with a skip carriage 12, which passes through the doors in the top portion of the dispenser. The skip carriage 12 encompasses also the eccentrically rotatable quasi cylindrical half-drum/hoppers 13 actuated by hydraulic cylinders 14.

Figure 16:
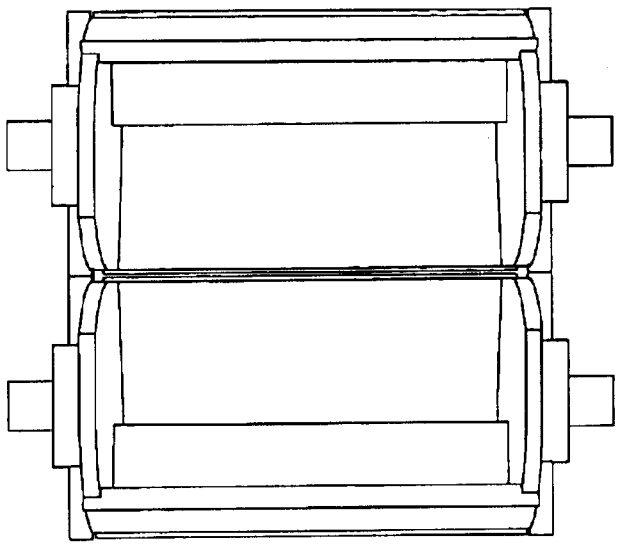
FIG. 16 shows the same pair of eccentrically rotatable quasi-cylindrical half-drums/hoppers rotated to a closed position to contain the scrap and other ferrous metallic charge for preheating, prior to dumping into the vessel of the Furnace.
Figure 15:
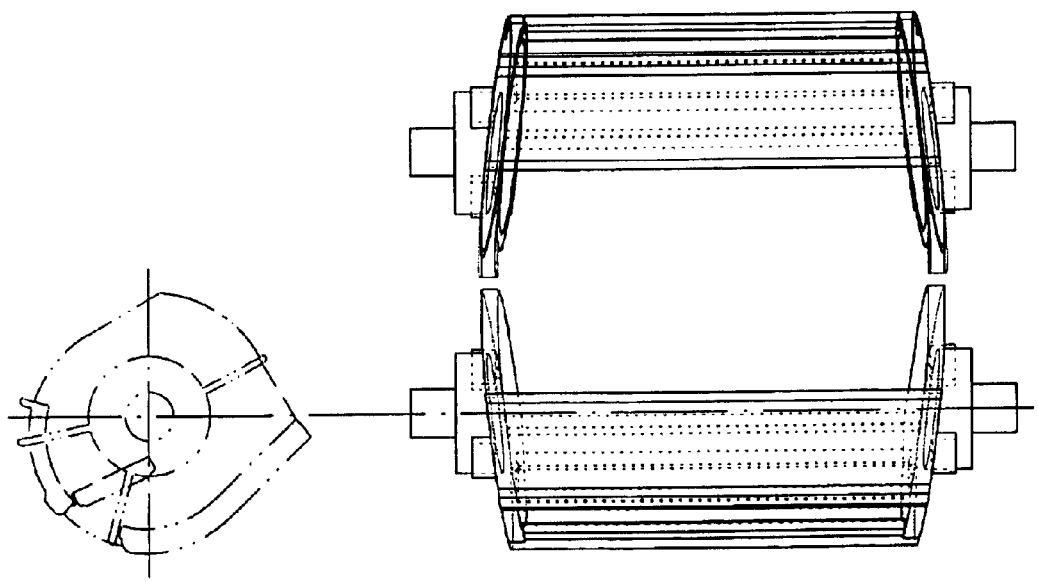
FIG. 15 shows a plan view of a pair of eccentrically rotatable quasi-cylindrical half-drum/hoppers rotated to the dump position.

In the closed position, shown in FIG. 1., and 16 the eccentrically rotatable quasi cylindrical half-drum/ hoppers 5 accept the solid scrap and other ferrous materials gravitationally descending from the opened eccentrically rotatable quasi cylindrical half-drum/hoppers 13 of the skip carriage 12. Due to the relatively high angle of repose (about 60 degrees) for solid scrap and other ferrous charge materials, the metallic charge is held in the space outlined by the shelves 17 and cylindrical portion of the eccentrically rotatable quasi cylindrical half-drum/hoppers 16. However, since the solid scrap and other ferrous charge materials are loose and granular the hot gases (as indicated by arrows in FIG. 1.) permeate through the solid scrap and other ferrous charge materials while held by the shelves 17 and cylindrical portion of the eccentrically rotatable quasi cylindrical half-drum/hoppers 16 and through the longitudinal openings 18 in the eccentrically rotatable quasi cylindrical half-drum/ hoppers 16 into the space above the solid scrap and other ferrous charge materials of the next pre-heating chamber. To allow gravitational descend- drop of solid scrap and other ferrous charge materials into the vessel 1 or from one chamber level of eccentrically rotatable quasi cylindrical half-drum/hoppers 15 to a lower chamber level and an other set of eccentrically rotatable quasi cylindrical half-drum/ hoppers 15 hydraulic cylinder 19 are actuated. The pair of opposing eccentrically rotatable quasi cylindrical half-drum/ hoppers moves from the closed position shown in FIG. 16, to the open position shown in FIG. 15.

By cycling in this manner a continuous gravitational descent of the solid scrap and other ferrous charge materials can be achieved and controlled from the skip carriage 12 through the top pair of eccentrically rotatable quasi cylindrical half-drum/hoppers 15, to the lower pair of eccentrically rotatable quasi cylindrical half-drum/hoppers 15 and than into the molten metal bath of the hearth of the vessel 1.

Of advantage the shelves 17 and cylindrical portions 16 of the rotatable quasi cylindrical half-drum/hoppers 15 can be fitted with water cooling channels or wear abrasion and heat resistant plates thereby significantly extending their service life. Distinguishing over U.S. Pat. No. 6,024,912 to Wunsche, the eccentrically rotatable quasi cylindrical half-drum/hoppers 15 have solid continuous shelves 17 and cylindrical portion 16 of the eccentrically rotatable quasi cylindrical half-drum/hoppers 15 which support and also control gravitational descent of the solid scrap and other ferrous charge materials and do not require the hot gases to flow through the permeable grid-iron gate structure of the prior art, As a result, plugging of the grid-iron structure or permeable surfaces is completely avoided. The serpentine pathway of the hot gases flows through the solid scrap and other ferrous charge materials enhances significantly the heat transfer from the hot gases to the pre-heated solid scrap and other ferrous charge materials. Concurrent flow of hot gases and solid scrap and other ferrous charge materials are assuring that the combustible gases developed during preheating process combusted by stationary oxy-fuel burners 20 located in the walls of the dispenser 21. In that way energy required for pre-heating and melting is reduced.

Although the above description relates to a specific preferred embodiment as presently contemplated by the inventor, it will be understood that the invention in its broad aspect includes mechanical and functional equivalents of the elements described herein but can be modified in various ways within the scope of protection defined by the appended claims.

What is claimed to be innovative and new and desired to be secured by Letters Patent of the United States is:

1. A unified preheating and steelmaking furnace system for high temperature and high efficiency preheating of recycled cold solid steel scrap and other ferrous charge materials and its consequent rapid melting in an integrated metallurgical furnace, with concurrent flow of scrap and hot gases, comprising:

an autonomous preheating structure, which is independently operated, energy efficient, safe to operate and pollution reducing with concurrent flow of initially cold scrap and hot waste gases, including an integrated inclined device for semi-continuous self charging and controlled, stepped and gradual preheating of the cold scrap and gravitational discharging of the preheated scrap into an integrated sealed metallurgical furnace operating in tandem with the preheating structure;

a scaled metallurgical furnace operating in tandem with the preheating structure and having a vessel shell of oval shape, equipped with a generally horizontally oriented slag free tapping system, where thermal energy is provided to the metallurgical furnace solely by one or more generally arcuate oxy-fuel burners/lances;

where the oval shaped furnace vessel shell has a refractory hearth bottom which is sloped toward a tap hole, and two trunnions, located on a half of the vessel shell closest to the taphole, and allowing for tilting of the furnace vessel for slag free tapping, where the tilting of the furnace is controlled by two hydraulic cylinders.

2. A system according to claim 1, where the preheating structure has a main vertical chamber of generally prismatic form and having a removable sealing cover at the main chamber top for semi-continuous feeding/charging of a cold charge of ferrous scrap mixture into the chamber.

3. A system according to claim 2, where the main vertical chamber has walls consisting of refractory or water cooled segments attached to a supporting structure.

4. A system according to claim 1 having an integrated, independently operating inclined skip charging/supplying mechanism for semi-continuous feeding of cold ferrous scrap mixture from an adjacent scrap storage location without the use of a charge bucket or overhead crane to an uppermost compartment in the main vertical chamber which is equipped with a charging opening sealing closure, the charging/supplying mechanism consisting of at least one inclined skip carriage with a permanent charging mechanism remotely controlled via hydraulic cylinders and encompassing a pair of eccentrically rotatable quasi-cylindrical half-drum/hoppers.

5. A system according to claim 2, having at least one cooled scrap gravitational descent controlling mechanism consisting of at least one pair of eccentrically rotatable quasi cylindrical half-drum/hoppers which divide the main vertical chamber into at least two compartments, being capable of holding at any time no less than one mass volume of the nominal charge required for one heat in the integrated metallurgical furnace.

6. A system according to claim 5, having at least two oxy-fuel burners installed into each compartment of the main vertical chamber for continuously controlled combustion of combustible gases through the entire height of the main vertical chamber.

7. A system according to claim 5, having gas monitoring sensors in each compartment of the main vertical chamber for real time analysis of gases and temperature measurement.

8. A system according to claim 2 having a water cooled heat resisting discharge mechanism for the controlled discharge of high temperature preheated scrap from an opening in a converging part of the main vertical chamber and the gravitational delivery of preheated scrap into the integrated metallurgical furnace through an opening in the vessel shell side wall or roof, the discharging mechanism consisting of at least one pair of eccentrically rotatable quasi cylindrical half-drum/hoppers.

9. A system according to claim 5 having two symmetric principal inlet openings at the highest point of the top compartment of the main vertical chamber for entrance of hot waste gases from the metallurgical furnace.

10. A system according to claim 1 having means for creating a negative internal pressure within the preheating structure forcing gases to flow from the highest point of the preheating structure through layers of scrap concurrent with the direction of flow of the gravitationally descending scrap.

11. A system according to claim 5 having a set of two dust catchers and a drop out box directly and vertically in-line under a discharging converging bottom compartment of the main vertical chamber.

12. A system according to claim 1 having a steam development device.

13. A system according to claim 1 having at least one hot waste gas by-pass duct.

14. A system according to claim 1 having a Venturi scrubber for the cooling of hot waste gases.

* * * * *